(12) United States Patent
Moreau et al.

(10) Patent No.: US 9,726,126 B2
(45) Date of Patent: Aug. 8, 2017

(54) FUEL INJECTOR

(71) Applicant: DELPHI INTERNATIONAL OPERATIONS LUXEMBOURG S.A.R.L., Bascharage (LU)

(72) Inventors: Christophe Moreau, La Chaussee Saint Victor (FR); Thierry Thibault, Saint Ouen les Vignes (FR); Thierry Cochet, Molineuf (FR); Jean Luc Beduneau, Blois (FR); Philippe Legrand, St. Gervais la Foret (FR)

(73) Assignee: Delphi International Operations Luxembourg, Luxembourg (LU)

( * ) Notice: Subject to any disclaimer, the term of this patent is extended or adjusted under 35 U.S.C. 154(b) by 0 days.

(21) Appl. No.: 15/036,350

(22) PCT Filed: Nov. 4, 2014

(86) PCT No.: PCT/EP2014/073662
§ 371 (c)(1),
(2) Date: May 12, 2016

(87) PCT Pub. No.: WO2015/071132
PCT Pub. Date: May 21, 2015

(65) Prior Publication Data
US 2016/0281665 A1 Sep. 29, 2016

(30) Foreign Application Priority Data

Nov. 12, 2013 (FR) ...................................... 13 61006

(51) Int. Cl.
*F02M 51/06* (2006.01)
*F02M 57/00* (2006.01)
(Continued)

(52) U.S. Cl.
CPC ...... *F02M 51/0653* (2013.01); *F02M 57/005* (2013.01); *F02M 61/20* (2013.01); *G01D 5/1655* (2013.01); *F02M 2200/245* (2013.01)

(58) Field of Classification Search
CPC ............. F02M 51/061; F02M 51/0625; F02M 51/0628; F02M 51/0635; F02M 51/0639;
(Continued)

(56) References Cited

U.S. PATENT DOCUMENTS

| | | | | |
|---|---|---|---|---|
| 5,595,215 A | * | 1/1997 | Wallace | F02M 65/005 137/554 |
| 7,055,762 B2 | * | 6/2006 | Gerber | F02M 65/005 123/617 |

FOREIGN PATENT DOCUMENTS

| | | |
|---|---|---|
| DE | 103 13 623 A1 | 10/2004 |
| DE | 103 19 329 A1 | 11/2004 |

(Continued)

OTHER PUBLICATIONS

International Search Report dated Feb. 23, 2015.

*Primary Examiner* — Darren W Gorman
(74) *Attorney, Agent, or Firm* — Joshua M. Haines (57) ABSTRACT

A fuel injector includes fixed metal components, in particular an injector body, a solenoid actuator equipped with a retaining spring that holds a control valve stem, a control valve body including a seat for the control valve stem, a spacer between the body of the control valve and an injection nozzle, a control chamber, and an injection needle seat. The fuel injector also includes movable metal components, in particular the control valve stem and an armature thereof and an injection needle. Surfaces of the metal components that are in contact with one another are contact surfaces. Resistive surface coatings are arranged on a number of the contact surfaces. The overall electrical resistivity of the injector between the body of the solenoid actuator and the
(Continued)

Fig. 1 body of the injector varies by at least three distinct ohm values intermittently according to the kinetics of the injection needle of the injector.

5 Claims, 3 Drawing Sheets

(51) Int. Cl.
*G01D 5/16* (2006.01)
*G01D 5/165* (2006.01)
*F02M 61/20* (2006.01)

(58) Field of Classification Search
CPC ........... F02M 51/0642; F02M 51/0646; F02M 51/0653; F02M 51/066; F02M 57/005; F02M 61/20; F02M 2200/24; F02M 2200/245; G01D 5/1655
USPC ........... 239/88–92, 96, 533.2, 533.8, 533.11, 239/585.1–585.5
See application file for complete search history.

(56) References Cited

FOREIGN PATENT DOCUMENTS

DE   10 2011 016168 A1   10/2012
WO        94/12788 A1    6/1994

\* cited by examiner

FUEL INJECTOR

CROSS REFERENCE TO RELATED APPLICATIONS

This application is a national stage application under 35 USC 371 of PCT Application No. PCT/EP2014/073662 having an international filing date of Nov. 4, 2014, which is designated in the United States and which claimed the benefit of FR Patent Application No. 1361006 filed on Nov. 12, 2013, the entire disclosures of each are hereby incorporated by reference in their entirety.

TECHNICAL FIELD

The present invention relates to a fuel injector and more particularly to an arrangement allowing closed-loop control of an injection system.

TECHNICAL BACKGROUND OF THE INVENTION

In the case of rail fuel injectors, which are nowadays common, the amount of injected fuel and the periods of time required to open and close the injector are dependent on the capability of industrial production means to produce the injectors whilst observing the key parameters of the injector. Consequently, there are variations. In addition, during operating cycles of fuel injectors, some parameters change due to the wear of the components. By way of example, the lifting and lowering times of the control valve change as well as those of the injection nozzle needle can be cited. Injector control strategies implemented nowadays in electronic injector control computers are unable to compensate for all of these variations. When the injector is new, a correction factor is applied in order to correct the primary variations in the periods of time required to open and close the needle of the injection nozzle and is controlled by the electromagnetic control valve. Other corrections aiming to adjust the control pulses of the electromagnetic actuator are based on acceleration sensors. Further steps for correcting the changes in key parameters of the injectors also consist of monitoring the voltage signal of the actuator, which reflects the closing of the control valve. However, the transfer function between the opening and the closing of the control valve and the opening and the closing of the needle of the injection nozzle is dependent on numerous uncontrolled parameters during the life of a vehicle and on the use of said vehicle. It is therefore important to propose a new solution that overcomes these problems.

SUMMARY OF THE INVENTION

The object of the present invention is to overcome the disadvantages of existing solutions by proposing electrical monitoring of the injector reflecting the movements of the injection needle of the injector.

A fuel injector comprises fixed metal components, in particular an injector body, a solenoid actuator equipped with a retaining spring that holds a control valve stem, a control valve body comprising a seat for the control valve stem, a spacer between the body of the control valve and an injection nozzle, a control chamber, and an injection needle seat. A fuel injector also comprises movable metal components, in particular the control valve stem and the armature thereof and the injection needle. The solenoid actuator also comprises control wires communicating with the outside of the injector by means of a connector arranged on the body of the injector. Those surfaces of the metal components that are in contact with one another are contact surfaces. Resistive surface coatings are arranged on a number of contact surfaces. The overall electrical resistivity of the injector between the body of the solenoid actuator and the body of the injector varies by at least three distinct ohm values intermittently according to the kinetics of the injection needle of the injector. The overall electrical resistivity of the injector can be modeled in accordance with the topology of an electric circuit formed of electrical resistors connected in series, these being equivalent to the contact surfaces of the metal components placed in contact with one another and arranged one on top of the other, electrical resistors connected in parallel, these being equivalent to the contact surfaces of the metal components placed in contact with one another and arranged one inside the other, and switches, these being equivalent to the instances of intermittent contact, for example the contact between the injection needle and seat thereof. The intermittent instances of contact change the value of the overall electrical resistivity intermittently according to the kinetics of the movable components of the injector. The topology of an electric circuit is the structure of connection of the different components of the electric circuit, that is to say in the cases described by the invention: electrical resistors and switches. In accordance with an embodiment, the resistive surface coatings are located on at least one contact surface between the seat of the injection needle and the injection needle, on at least one contact surface between the body of the injection nozzle and the injection needle, on at least one contact surface between the injection needle and the spacer, on at least one contact surface between the body of the injection nozzle and the spacer, on at least one contact surface between the body of the injector and the body of the control valve, and on at least one contact surface between the body of the injector and the body of the solenoid actuator. The injector comprising the resistive surface coatings arranged according to the described embodiment can be modeled in accordance with a first equivalent electric circuit comprising a first contact point equivalent to the electric potential of the body of the injection nozzle and the body of the injector, a second contact point equivalent to the electric potential of the seat of the injection needle, a third contact point equivalent to the electric potential of the injection needle, a fourth contact point equivalent to the electric potential of the spacer, of the body of the control valve, of the solenoid actuator, and of the ceiling of the control chamber, a first switch connected between the first contact point and the second contact point, a first resistor connected between the second contact point and the third contact point, a second resistor connected between the first contact point and the third contact point, a third resistor connected between the third contact point and the fourth contact point, a second switch connected between the third contact point and the fourth contact point, a fourth resistor connected between the first contact point and the fourth contact point, a fifth resistor connected between the first contact point and the fourth contact point, and a sixth resistor connected between the first contact point and the fourth contact point. The equivalent circuit has the overall electrical resistivity of the injector between the fourth contact point and the first contact point. The overall equivalent resistivity varies depending on the position of the injection needle. An additional electrical resistor can be connected between the body of the solenoid actuator and one of the control wires thereof, said control wire being the wire for measuring the overall electrical resistivity. Alternatively, an electric circuit with parallel topology is connected between the body of the actuator and one of the control wires of the actuator, said control wire being the wire for measuring the overall electrical resistivity. Said parallel electric circuit comprises a first electrical resistor in series with a first diode and a second electrical resistor in series with a second diode mounted in a direction opposite to the first diode. Alternatively, a wire is connected to the body of the solenoid actuator, said wire joining the outer part of the injector being the wire for measuring the overall electrical resistivity.

In accordance with another embodiment the resistive surface coatings are located on at least one contact surface between the seat of the injection needle and the injection needle, on at least one contact surface between the body of the injection nozzle and the injection needle, on at least one contact surface between the body of the injection nozzle and the spacer, and on at least one contact surface between the spacer and the body of the control valve. The injector comprising the resistive surface coatings arranged in accordance with the described embodiment advantageously can be modeled in accordance with a second equivalent electric circuit comprising a first contact point equivalent to the electric potential of the injection needle, of the spacer and of the wall of the control chamber, a second contact point equivalent to the electric potential of the seat of the injection needle, a third contact point equivalent to the electric potential of the body of the injection nozzle and of the ceiling of the control chamber, a first switch connected between the first contact point and the third contact point, a second switch connected between the second contact point and the third contact point, a first resistor connected between the first contact point and the second contact point, a second resistor connected between the first contact point and the third contact point, a third resistor connected between the first contact point and the third contact point, and a fourth resistor connected between the first contact point and the third contact point. The equivalent circuit has the overall electrical resistivity of the injector between the first contact point and the third contact point. The overall equivalent resistivity varies depending on the position of the injection needle. An additional electrical resistor can be connected between the wall of the control chamber and one of the control wires of the solenoid actuator, said control wire being the wire for measuring the overall electrical resistivity. Alternatively, an electric circuit with parallel topology is connected between the wall of the control chamber and one of the control wires of the actuator, said control wire being the wire for measuring the overall electrical resistivity. Said parallel electric circuit comprises a first electrical resistor in series with a first diode and a second electrical resistor in series with a second diode mounted in a direction opposite to the first diode. Alternatively, a wire is connected to the wall of the control chamber, said wire joining the outer part of the injector being the wire for measuring the overall electrical resistivity.

The body of the injector may be an electrical ground reference of the measurement of the overall electrical resistivity. The resistive surface coatings may have a thickness between 1 µm and 5 µm. The resistive surface coatings may have a rigidity between 1 GPa and 35 GPa. The resistive surface coatings may be from the family of amorphous carbons (a-C) or of the ceramic type. The insertion of a surface coating of the ceramic type has the advantage of providing a resistive value that is more reproducible than a coating of the resin type.

A method for measuring the position and the speed of the injection needle as well as the wear of the resistive surface coatings of the fuel injector provided in accordance with the invention may comprise the following steps:
  detecting a first ohm value of the overall electrical resistivity,
  determining the position of the injection needle by comparison of the detected first ohm value of the overall electrical resistivity with the 3 possible ohm values of the overall electrical resistivity,
  determining the wear of the resistive surface coatings by comparison of the detected first ohm value of the overall electrical resistivity with the 3 possible ohm values of the overall electrical resistivity,
  detecting a second ohm value of the overall electrical resistivity, which value is different from the detected first ohm value of the overall resistivity,
  determining the time lapse between the detection of the first and the second ohm value of the overall electrical resistivity, and
  determining the speed of movement of the injection needle (38).

BRIEF DESCRIPTION OF THE DRAWINGS

Further features, objectives and advantages of the invention will become clear upon reading the following detailed description and with reference to the accompanying drawings, which are provided by way of non-limiting example and in which.

DESCRIPTION OF PREFERRED EMBODIMENTS

Figure 1:
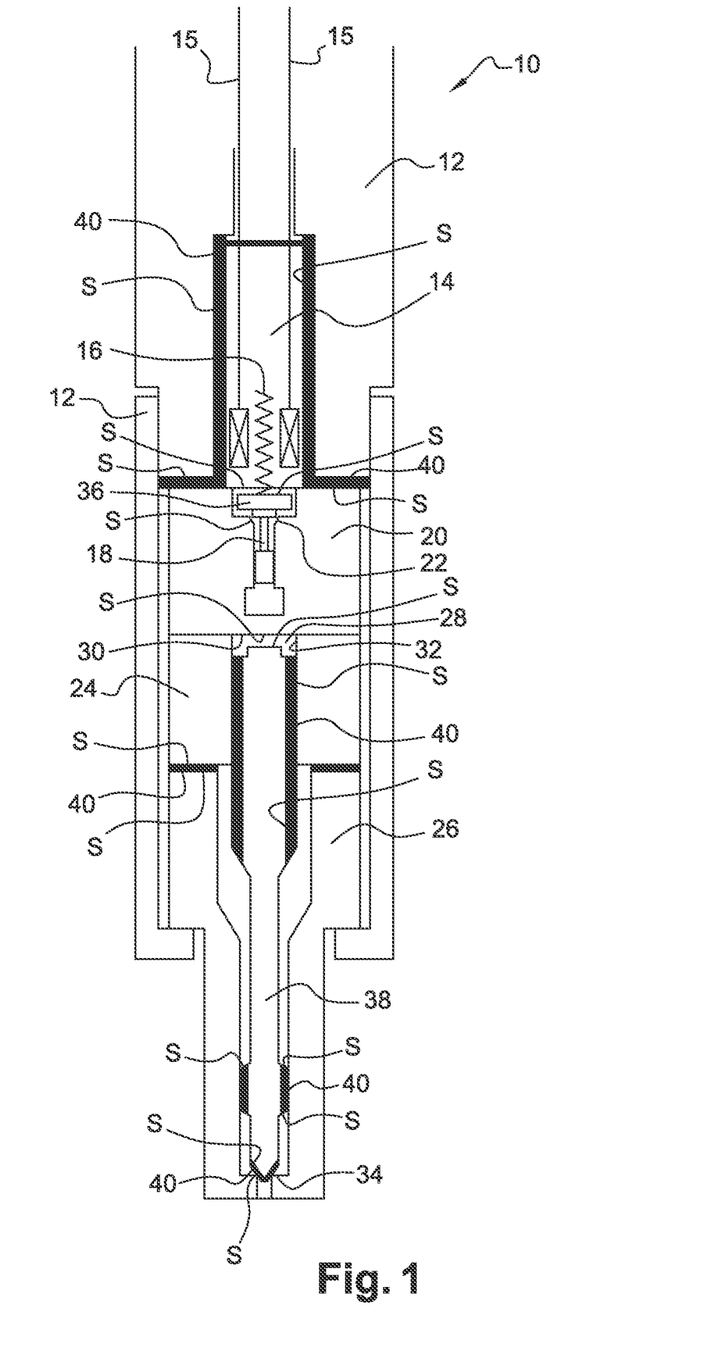
FIG. 1 is an illustration of a fuel injector in accordance with a first exemplary embodiment of the present invention.

In accordance with FIG. 1, a fuel injector 10 is an assembly of metal components comprising fixed components and movable components. The main fixed components of an injector comprise, in particular, an injector body 12, a solenoid actuator 14 equipped with a retaining spring 16 that holds a control valve stem 18, a control valve body 20 comprising a seat for the control valve stem 22, a spacer 24 between the body of the control valve 20 and an injection nozzle 26, a control chamber 28 comprising a ceiling 30 and a wall 32, and an injection needle seat 34. The movable components of the injector comprise, in particular, the control valve stem 18, the armature 36 of the control valve connected to the control valve stem 18, and the injection needle 38. The movable components of the injector are controlled by means of control wires 15 of the solenoid actuator, said control wires communicating with the outside of the injector by means of a connector arranged on the injector 10.

The fixed components clearly have surfaces in contact with one another, these being referred to as contact surfaces S. The movable components also have surfaces in contact with the fixed components of the injector, these also being referred to as contact surfaces S. The movable components also have surfaces that come into contact intermittently with other surfaces of the injector 10, these also being referred to as contact surfaces S.

In order to clearly understand these different instances of contact, reference is made by way of example to the contact surfaces S between two fixed components, such as the contact surfaces S between the body of the solenoid actuator 14 and the body of the control valve 20 and also for example the contact surfaces S between the body of the control valve 20 and the spacer 24, the spacer 24 having a surface in contact with the control chamber 28. Reference is also made by way of example to the contact surfaces S between a movable component and a fixed component, such as the contact surfaces S between the injection needle 38 and seat 34 thereof, and also the contact surfaces S between the injection needle 38 and the ceiling of the control chamber 30. The contact between the injection needle 38 and seat 34 thereof is established during phases of non-injection. The injection needle 38 is in the closed position. The contact between the injection needle 38 and the ceiling of the control chamber 30 is established when the injection needle 38 is in the uppermost position, i.e. at the end of an upward stroke during the injection of fuel. The injection needle 38 is also in permanent contact with the injection nozzle 26 in which said needle performs its movement back and forth. This movement implies that neither the contact of the injection needle 38 with the ceiling of the control chamber 30 nor the contact of the injection needle 38 with the seat 34 thereof is established during this course of movement. The control valve stem 18 also has a surface in intermittent contact with the seat 22 thereof. The contact between the control valve stem 18 and seat 22 thereof is established when the control valve is closed. The control valve stem 18 is in permanent contact with the retaining spring 16 of the solenoid actuator. It should be noted that the armature 36 of the control valve connected to the control valve stem 18 is also in contact with the body of the solenoid actuator 14. The contact between the armature 36 of the control valve and the body of the solenoid actuator 14 is established when the control valve is open and the armature 36 of the control valve is in the uppermost position. During the opening and closing stroke of the control valve, the contact between the armature 36 of the control valve and the body of the solenoid actuator 14 and the contact between the control valve stem 18 and seat 22 thereof therefore are not established. All of the contact surfaces S between the different metal components of the injector 10 have an electrical resistivity close to zero.

Figure 2:
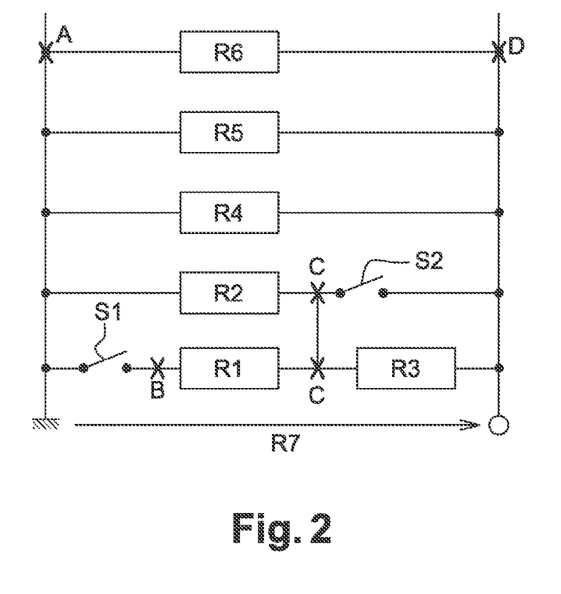
FIG. 2 is a schematic block diagram illustrating an equivalent electrical resistive network of the injector according to FIG. 1.
Figure 3:
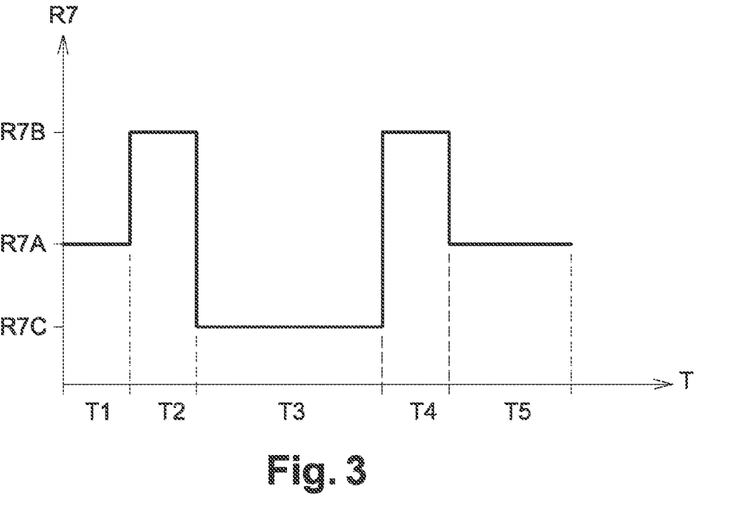
FIG. 3 is a graph illustrating the progression of the equivalent resistivity of the injector according to FIG. 2 and according to the kinetics of the injection needle.

In accordance with FIGS. 1, 2 and 3 the invention consists of arranging resistive surface coatings 40 on a number of contact surfaces S of the injector 10 and of allocating at least 3 ohm values of overall electrical resistivity, preferably distinct values, R7A, R7B and R7C, to the overall electrical resistivity R7 of the injector 10 measured between the body of the solenoid actuator 14 and the body of the injector 12, said values varying depending on the kinetics of the movable components, such as the injection needle 38 or the control valve stem 18. The introduction of resistive surface coatings 40 having technical features, such as electrical resistivity, makes it possible to model the injector 10 by at least one equivalent resistive electric circuit (FIG. 2). By way of example, the topology of the electric circuit equivalent to the overall electrical resistivity R7 of the injector 10 includes electrical resistors connected in series, these being equivalent to the contact surfaces S of the metal components placed in contact with one another, coated with resistive surface coatings 40 and arranged one on top of the other. Said circuit will also include electrical resistors connected in parallel, these being equivalent to the contact surfaces S of the metal components placed in contact with one another, coated with resistive surface coatings 40 and arranged one inside the other. Said circuit will also include electric switches, these being equivalent to the instances of intermittent contact, the switches being closed when the contact is established. The switch is open when the contact is not established. The resistivity of the instances of permanent or established contact will be close to zero if the contact surfaces S thereof are not coated with resistive surface coatings 40. By contrast, the resistivity of the instances of permanent contact and established contact will be reflective of the resistive surface coating 40 covering said points of contact. By way of reference, the instances of permanent contact and the instances of established contact covered by resistive surface coatings 40 can be assimilated to electrical resistors having values ranging from the order of an ohm to around a hundred kilohms in accordance with the embodiment of the invention.

The resistive surface coatings 40 preferably have a thickness of a few µm, for example a thickness between 1 µm and 5 µm. Their rigidity, which is comparable to that of steel, or greater, is in the order of gigapascals (GPa), preferably between 1 GPa and 35 GPa. In order to satisfy the aforementioned technical features, such as the electrical resistivity and the rigidity of these resistive surface coatings 40, resistive surface coatings 40 based on amorphous carbon (a-C), more commonly known as 'DLC' (diamond like carbon), and also coatings of the ceramic type are preferred. The contact surfaces S can each be coated independently of one another with different types of surface coatings.

In accordance with a first embodiment illustrated by FIG. 1 the resistive surface coatings 40 are preferably located:

on at least one contact surface S between the seat 34 of the injection needle 38 and the injection needle 38, thus making the intermittent contact of the injection needle 38 with the seat 34 thereof resistive when the contact is established, on at least one contact surface S between the body of the injection nozzle 26 and the injection needle 38, on at least one contact surface S between the injection needle 38 and the spacer 24, the resistivity measured between the injection needle 38 and the spacer 24 being that of the resistive surface coating 40 when the injection needle 38 is not in contact with the ceiling of the control chamber 30, and, in the opposite case when the injection needle 38 is in contact with the ceiling of the control chamber 30, the resistivity measured between the injection needle 38 and the spacer 24 is close to zero, on at least one contact surface S between the body of the injection nozzle 26 and the spacer 24, on at least one contact surface S between the body of the injector 12 and the body of the control valve 20, on at least one contact surface S between the body of the injector 12 and the body of the solenoid actuator 14.

It should be noted that the electrical resistivity between the body of the injector 12 and the body of the injection nozzle 36 is close to zero. This means that there is no resistive surface coating between these metal parts. Alternatively, a non-resistive surface coating or a surface coating having very low resistance, i.e. an ohm value of zero or a very low ohm value, for example having a maximum resistivity in the order of an ohm, can be arranged between these two metal parts for reasons of protection against the premature wear of the metal parts. It should be noted that the electrical resistivity is also close to zero between the body of the solenoid actuator 14 and the body of the control valve 20, between the body of the control valve 20 and the spacer 24, and also between the body of the control valve 20 and the ceiling of the control chamber 30. This means that there is no resistive surface coating between these metal parts. Alternatively, a non-resistive surface coating or a surface coating having very low resistance, i.e. an ohm value of zero or a very low ohm value, for example having a maximum resistivity in the order of an ohm, can be arranged between these metal parts for reasons of protection against the premature wear of the metal parts.

FIG. 2 shows a first example of the modeling of the equivalent overall electrical resistivity R7 of the fuel injector 10 according to the arrangement of resistive surface coatings on the contact surfaces S presented in accordance with the first embodiment illustrated by FIG. 1.

In accordance with FIG. 2, the equivalent electric circuit of the injector 10 comprises a first contact point A equivalent to the electric potential of the body of the injection nozzle 26 and the body of the injector 12, a second contact point B equivalent to the electric potential of the seat of the injection needle 34, a third contact point C equivalent to the electric potential of the injection needle 38, a fourth contact point D equivalent to the electric potential of the spacer 24, of the body of the control valve 20, of the body of the solenoid actuator 14, and the ceiling of the control chamber 30, a first switch S1 connected between the first contact point A and the second contact point B, a first resistor R1 connected between the second contact point B and the third contact point C, a second resistor R2 connected between the first contact point A and the third contact point C, a third resistor R3 connected between the third contact point C and the fourth contact point D, a second switch S2 connected between the third contact point C and the fourth contact point D, a fourth resistor R4 connected between the first contact point A and the fourth contact point D, a fifth resistor R5 connected between the first contact point A and the fourth contact point D, and a sixth resistor R6 connected between the first contact point A and the fourth contact point D. The overall electrical resistivity R7 of the injector 10 can therefore be measured between the fourth contact point D and the first contact point A. In order to facilitate the measurement of the overall electrical resistivity R7 of this configuration, the body of the injector 12 may serve as electrical ground.

As described by way of FIG. 3, the overall electrical resistivity R7 of the first topology illustrated in FIG. 2 varies depending on the position of the injection needle 38. A first value R7A of the overall electrical resistivity R7 can be measured when the injection needle 38 is in contact with the seat 34 thereof. The injector 10 is said to be in the closed position. This is the case during a first phase T1 at the start of the injection cycle and during a fifth phase T5 at the end of the injection cycle. During the first phase T1 and the fifth phase T5, the first switch S1 is closed, since the injection needle 38 is in contact with the seat 34 thereof, whereas the second switch S2 is open, since the injection needle 38 is not in contact with the ceiling of the control chamber 30. When the injection needle 38 performs its stroke toward the ceiling of the control chamber 30, a second value R7B of the overall electrical resistivity R7 can be measured. The injector 10 is then in a second phase T2 corresponding to the start of injection. During the second phase T2 the first switch S1 is open, since the injection needle 38 is no longer in contact with the seat 34 thereof, and the second switch S2 is also open, since the injection needle 38 is not in contact with the ceiling of the control chamber 30.

When the injection needle 38 has finished its stroke into the uppermost position with the ceiling of the control chamber 30, the injector 10 is in a third phase T3 of established injection. During this third phase T3 a third value R7C of the overall electrical resistivity R7 can be measured. During this third phase T3 the first switch S1 is open, since the injection needle 38 is no longer in contact with the seat 34 thereof, and the second switch S2 is closed, since the injection needle 38 is in contact with the ceiling of the control chamber 30. When the injector 10 has performed the injection the injection needle 38 performs a stroke passing from the ceiling of the control chamber 30 toward the seat 34 of the injection needle. The injector 10 is in a fourth phase T4. During this fourth phase T4 the value of the overall electrical resistivity R7 is equivalent to the second value R7B identified during the phase of the start of injection, since the first switch S1 and the second switch S2 are open, the injection needle 38 being in contact neither with the seat 34 thereof, nor with the ceiling of the control chamber 30.

In order to allow the measurement of the overall electrical resistivity R7 of the injector 10 of which the resistive surface coatings 40 have been preferably disposed as described above, a number of solutions preferably can be applied. It should be noted that whatever the solution making it possible to allow the measurement of the overall electrical resistivity R7, the means associated with this measurement will induce an electric current by way of the overall electrical resistivity R7, which means that electric current will pass through the injector 10 during phases of measurement of the overall electrical resistivity R7. A first solution may consist in allowing the measurement of the overall electrical resistivity R7 between the electrical ground defined by the body of the injector 12 and a wire connected to the body of the solenoid actuator 14. This wire may advantageously join the outer part of the injector 10 by following a set of grooves in the metal parts leading said wire to a connector accessible by a means for measuring the overall electrical resistivity R7. This wire accessible from outside the injector 10 is therefore the wire for measuring the overall electrical resistivity R7. In this first solution, the orders of magnitude of the resistors R1, R2 and R3 may be in the order of tens of ohms to tens of kilohms, wherein in particular a value of R2 is preferably twice the value of R3. This order of magnitude enables optimum detection of the movement of the injection needle 38 and more particularly makes it possible to determine the time taken by the injection needle 38 to move between its closed position and its uppermost position, and vice versa. In this first solution, the orders of magnitude of the resistors R4, R5 and R6 may be greater than around a hundred kilohms in order to limit the leakage currents to the injector body 12 during measurement phases.

A second solution may consist of adding an additional electrical resistor between the body of the solenoid actuator 14 and one of the control wires 15 of the solenoid actuator. In this way, the overall electrical resistivity R7 is measured directly between the control wire connected to this additional electrical resistor and the electrical ground defined by the body of the injector 12. In other words, the control wire connected to this additional electrical resistor is the wire for measuring the overall electrical resistivity R7 of the injector 10. In this second solution the orders of magnitude of the resistors R1, R2 and R3 may be in the order of tens of ohms, wherein in particular a value of R2 is preferably twice the value of R3. This order of magnitude enables optimum detection of the movement of the injection needle 38 and more particularly makes it possible to determine the time taken by the injection needle 38 to move between its closed position and its uppermost position, and vice versa. In this second solution, the orders of magnitude of the resistors R4, R5 and R6 may be greater than around ten kilohms in order to limit the leakage currents to the injector body 12 during measurement phases.

A third solution may consist of adding a parallel electronic structure between the body of the solenoid actuator 14 and one of the control wires 15 of the solenoid actuator, said structure comprising a first resistor in series with a first diode and a second resistor in series with a second diode mounted in a direction opposite to the first diode. In other words, the control wire connected to this electronic structure is the wire for measuring the overall electrical resistivity R7 of the injector 10. The electrical ground may be defined by the body of the injector 12. This topology advantageously makes it possible to keep constant the current circulating in the injector 10 during the phases of opening and closing of the injection needle 38. From an electronic viewpoint, this topology makes it possible to maintain a constant absolute value of the control current of the solenoid actuator when there are differences in control voltages supported by the solenoid of the actuator. The ratio between the values of the first resistor and the second resistor of this parallel structure is advantageously ten. The greater resistance value is attributed to the first resistor, through which the current circulating in the injector 10 passes when the injection needle 38 is in the closed position. It should be noted that the polarization of the first diode enables the circulation of the current from the body of the solenoid actuator 14 to the seat of the injection needle 34 when the injection needle 38 is in the closed position, the current finishing its path through the electrical ground defined by the body of the injector 12. The measurement of the overall electrical resistivity R7 is accessible between the control wire of the solenoid actuator and the electrical ground defined by the body of the injector 12. In this third solution the orders of magnitude of the resistors R1, R2 and R3 may be in the order of tens of ohms, wherein in particular a value of R2 is preferably twice the value of R3. This order of magnitude enables optimum detection of the movement of the injection needle 38 and more particularly makes it possible to determine the time taken by the injection needle 38 to move between its closed position and its uppermost position, and vice versa. In this third solution, the orders of magnitude of the resistors R4, R5 and R6 may be greater than around ten kilohms in order to limit the leakage currents to the injector body 12 during measurement phases.

The fuel injector 10 provided with the resistive surface coatings 40 can be subject to a diagnosis. The invention makes it possible to propose a first method for measuring the position and the speed of the injection needle 38 of the injector 10 and also for measuring the level of wear of the resistive surface coatings 40. The value of the overall resistivity R7 of the injector 10 measured at a given moment in time can be compared with the known 3 ohm values of overall electrical resistivity R7A, R7B and R7C. If the measured ohm value is comparable to the first value R7A, the injection needle 38 is in its closed position, i.e. in a lowermost position in the seat 34 thereof. If the measured ohm value is comparable to the third value R7C, the injection needle 38 is in its uppermost position, i.e. in contact with the ceiling of the control chamber 30. If the measured ohm value is comparable to the second value R7B, the injection needle 38 is traveling over its stroke. The direction of the stroke can be determined depending on the preceding measured value, which is different from R7B. If the preceding measured value of the overall electrical resistivity R7 was the first value R7A, the direction of the stroke of the injection needle 38 is said to be rising, i.e. from the seat of the injection needle 34 to the ceiling of the control chamber 30. If the preceding measured value of the overall electrical resistivity R7 was the third value R7C, the direction of the stroke of the injection needle is said to be falling, i.e. from the ceiling of the control chamber 30 to the seat of the injection needle 34. In order to measure the speed of the injection needle 38, an extremely quick sampling, for example in the order of a tenth of a microsecond, makes it possible to determine the time lapse T between each change in the measured value of the overall electrical resistivity R7. In the knowledge of the direction of the stroke of the injection needle 38, and also in the knowledge of the distance to be travelled by the injection needle 38 from its lowermost position to its uppermost position, a simple calculation consisting of dividing the distance travelled by the time lapse T makes it possible to determine the speed of the injection needle 38 in the two directions travelled by the injection needle 38. It should be noted that the speed of the injection needle 38 may be different according to the direction of movements of the injection needle 38. In order to measure the level of wear of the resistive surface coatings 40 arranged in the injector 10, it is sufficient to compare the measured value of the overall electrical resistivity R7 with the known 3 ohm values of overall electrical resistivity R7A, R7B and R7C. Since these three values are sufficiently distinct from one another, the absolute value identified from the smallest result given by the difference between the measured value of the overall electrical resistivity R7 and the first value R7A, the second value R7B and the third value R7C respectively at a given moment in time is proportional to the level of wear of the resistive surface coatings 40. In other words, the wear of the resistive surface coatings 40 leads to a change in the overall electrical resistivity R7 of the injector. This change may make it possible to activate a warning signal in the case of a value deemed to be inopportune for the operation of the injector 10. In addition, a periodical self-calibration method may make it possible to regularly update the reference values of the overall electrical resistivity R7, i.e. to update the 3 overall electrical resistivity ohm values R7A, R7B and R7C, thus making it possible to eliminate changes in the overall electrical resistivity R7 caused for example by temperature.

Figure 4:
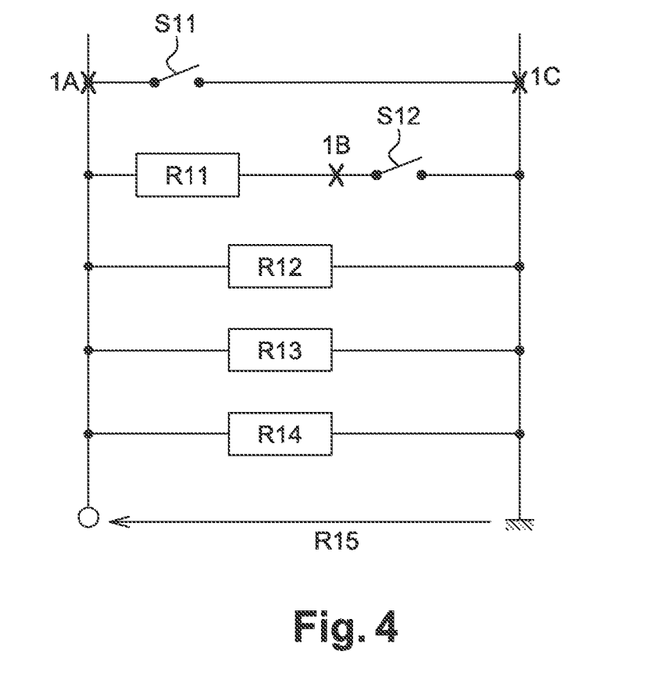
FIG. 4 is a schematic block diagram illustrating another equivalent electrical resistive network of the injector in accordance with a second embodiment.

FIG. 4 shows a second example of the modeling of the equivalent overall electrical resistivity R15 of the fuel injector 10 according to a second arrangement of resistive surface coatings 40 on the contact surfaces S. The resistive surface coatings are preferably located:

- on at least one contact surface S between the injection needle seat 34 and the injection needle 38, thus making the intermittent contact between the injection needle 38 and seat 34 thereof resistive when the contact is established,
- on at least one contact surface S between the body of the injection nozzle 26 and the injection needle 38,
- on at least one contact surface S between the body of the injection needle 26 and the spacer 24, and
- on at least one contact surface S between the spacer 24 and the body of the control valve 20.

It should be noted that the electrical resistivity between the body of the injector 12 and the body of the injection nozzle 26 is close to zero. This means that there is no resistive surface coating between these metal parts. Alternatively, a non-resistive surface coating or a surface coating having very low resistance, i.e. an ohm value of zero or a very low ohm value, for example having a maximum resistivity in the order of an ohm, can be arranged between these two metal parts for reasons of protection against the premature wear of the metal parts.

It should be noted that the electrical resistivity between the body of the injector 12 and the body of the control valve 20 is close to zero. This means that there is no resistive surface coating between these metal parts. Alternatively, a non-resistive surface coating or a surface coating having very low resistance, i.e. an ohm value of zero or a very low ohm value, for example having a maximum resistivity in the order of an ohm, can be arranged between these two metal parts for reasons of protection against the premature wear of the metal parts.

It should be noted that the electrical resistivity between the injection needle 38 and the wall of the control chamber 32 is close to zero. This means that there is no resistive surface coating between these metal parts. Alternatively, a non-resistive surface coating or a surface coating having very low resistance, i.e. an ohm value of zero or a very low ohm value, for example having a maximum resistivity in the order of an ohm, can be arranged between these two metal parts for reasons of protection against the premature wear of the metal parts.

In this particular embodiment it will be noted that when the injection needle 38 arrives in its uppermost position at the ceiling of the control chamber 30, the resistivity between the injection needle 38 and the spacer 24 is close to zero, since there are no resistive surface coatings on at least one contact surface S of these metal parts. Alternatively, a non-resistive surface coating or a surface coating having very low resistance, i.e. an ohm value of zero or a very low ohm value, for example having a maximum resistivity in the order of an ohm, can be arranged between these two metal parts in contact for reasons of protection against the premature wear of the metal parts.

According to FIG. 4 the equivalent electric circuit of the injector 10 comprises a first contact point 1A equivalent to the electric potential of the injection needle 38, of the spacer 24 and of the wall of the control chamber 32, a second contact point 1B equivalent to the electric potential of the seat 34 of the injection needle, a third contact point 1C equivalent to the electric potential of the body of the injection nozzle 26 and the ceiling of the control chamber 30, a first switch S11 connected between the first contact point 1A and the third contact point 1C, a second switch S12 connected between the second contact point 1B and the third contact point 1C, a first resistor R11 connected between the first contact point 1A and the second contact point 1B, a second resistor R12 connected between the first contact point 1A and the third contact point 1C, a third resistor R13 connected between the first contact point 1A and the third contact point 1C, and a fourth resistor R14 connected between the first contact point 1A and the third contact point 1C. For this topology, the overall electrical resistivity R15 of the injector can therefore be measured between the first contact point 1A and the third contact point 1C. In order to facilitate the measurement of the overall electrical resistivity R15 of this configuration, the body of the injector 12 may serve as electrical ground.

Figure 5:
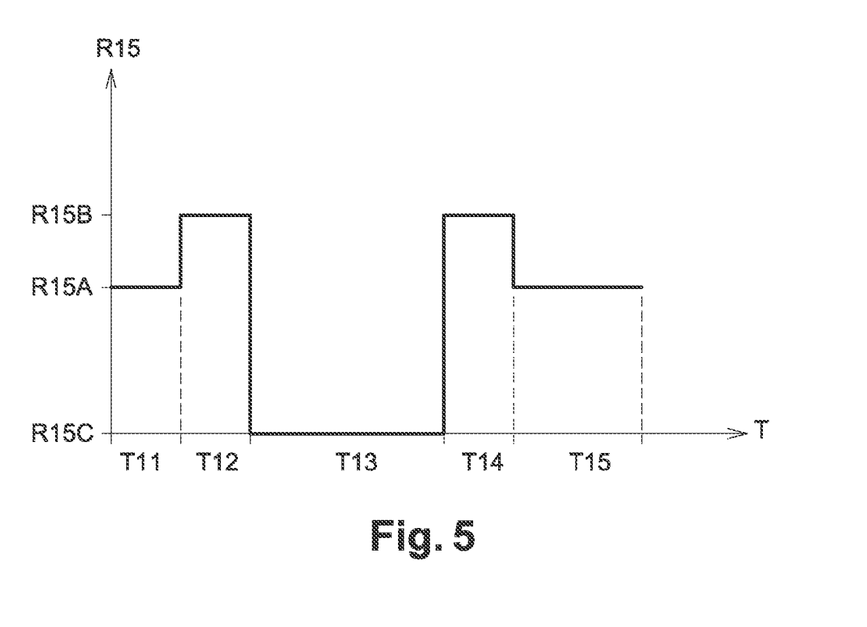
FIG. 5 is another graph illustrating the progression of the equivalent resistivity of the injector according to FIG. 4 and according to the kinetics of the injection needle.

As described by way of FIG. 5, the overall electrical resistivity R15 of the topology illustrated in FIG. 4 varies depending on the position of the injection needle 38. A first value R15A of the overall electrical resistivity R15 can be measured when the injection needle 38 is in contact with the seat 34 thereof. The injector 10 is said to be in the closed position. This is the case during a first phase T11 at the start of the injection cycle and during a fifth phase T15 at the end of the injection cycle. During the first phase T11 and the fifth phase T15, the second switch S12 is closed, since the injection needle 38 is in contact with the seat thereof, whereas the first switch S11 is open, since the injection needle 38 is not in contact with the ceiling of the control chamber 30. When the injection needle 38 performs its stroke toward the ceiling of the control chamber 30, a second value R15B of the overall electrical resistivity R15 can be measured. The injector 10 is then in a second phase T12 corresponding to the start of injection. During this second phase T12 the second switch S12 is open, since the injection needle 38 is no longer in contact with the seat thereof, and the first switch S11 is also open, since the injection needle 38 is not in contact with the ceiling of the control chamber 30. When the injection needle 38 has reached the end of its stroke into an uppermost position with the ceiling of the control chamber 30, the injector 10 is in a third phase T13 of established injection. During this third phase T13, a third value R15C of the overall electrical resistivity R15 can be measured. During this third phase T13 the second switch S12 is open, since the injection needle 38 is no longer in contact with the seat 34 thereof, and the first switch S11 is closed, since the injection needle 38 is in contact with the ceiling of the control chamber 30. This third value R15C of overall electrical resistivity R15 is then close to zero. When the injector 10 has performed the injection the injection needle 38 travels over a path passing from the ceiling of the control chamber 30 towards the seat thereof. The injector is in a fourth phase T14. During this fourth phase T14 the value of the overall electrical resistivity R15 is equivalent to the second value R15B identified during the phase of the start of injection, since the first switch S11 and the second switch S12 are open, the injection needle 38 being in contact neither with the seat 34 thereof, nor with the ceiling of the control chamber 30. In order to allow the measurement of the overall electrical resistivity R15 of the injector 10 of which the resistive surface coatings 40 have been disposed as described above, a number of solutions preferably can be applied. It should be noted that whatever the solution making it possible to allow the measurement of the overall electrical resistivity R15, the means associated with this measurement will induce an electric current by way of the overall electrical resistivity R15, which means that electric current will pass through the injector 10 during phases of measurement of the overall electrical resistivity R15. A first solution may consist in allowing the measurement of the overall electrical resistivity R15 between the electrical ground defined by the body of the injector 12 and a wire connected to the wall of the control chamber 32. This wire may advantageously join the outer part of the injector by following a set of grooves in the metal parts leading said wire to a connector accessible by a means for measuring the overall electrical resistivity R15. The use of channels in the injector as a passage for the wire or else the micro-drilling of the body of the injector 12 as far as the control chamber 28 so as to allow the passage of the wire could also be conceivable. This wire accessible from outside the injector is the wire for measuring the overall electrical resistivity R15.

A second solution may consist of adding an additional electrical resistor between the wall of the control chamber 32 and one of the control wires 15 of the solenoid actuator. The measurement of the overall electrical resistivity R15 is accessible between the control wire of the solenoid actuator connected to this additional electrical resistor and the electrical ground defined by the body of the injector 12. In other words, the control wire connected to this electrical resistor is the wire for measuring the overall electrical resistivity R15 of the injector 10.

A third solution may consist of adding a parallel electronic structure between the wall of the control chamber 32 and one of the control wires 15 of the solenoid actuator, said structure comprising a first resistor in series with a first diode and a second resistor in series with a second diode mounted in a direction opposite to the first diode. In other words, the control wire connected to this electronic structure is the wire for measuring the overall electrical resistivity R15 of the injector. The electrical ground is defined by the body of the injector 12. This topology advantageously makes it possible to keep constant the current circulating in the injector during the phases of opening and closing of the injection needle 38. From an electronic viewpoint, this topology makes it possible to maintain a constant absolute value of the control current of the solenoid actuator when there are differences in control voltages supported by the solenoid of the actuator. The ratio between the values of the first resistor and the second resistor of this parallel structure is advantageously ten. The greater resistance value is attributed to the first resistor, through which the current circulating in the injector 10 passes when the injection needle 38 is in the closed position. It should be noted that the polarization of the first diode enables the circulation of the current from the body of the solenoid actuator 14 to the seat of the injection needle 34 when the injection needle 38 is in the closed position, the current finishing its path through the electrical ground defined by the body of the injector 12. The measurement of the overall electrical resistivity R15 is accessible between the control wire of the solenoid actuator and the electrical ground defined by the body of the injector 12.

The invention claimed is:

1. A fuel injector comprising:
   fixed metal components, including an injector body, a solenoid actuator equipped with a retaining spring that holds a control valve stem, a control valve body comprising a seat for the control valve stem, an injection nozzle having an injection needle seat, a spacer between the control valve body and the injection nozzle, and a control chamber; and
   movable metal components, including the control valve stem and an armature thereof and an injection needle, said solenoid actuator comprising control wires communicating with the outside of the fuel injector,
   wherein surfaces of the metal components that are in contact with one another are contact surfaces, and
   wherein resistive surface coatings are arranged on a number of the contact surfaces, the overall electrical resistivity of the fuel injector between a body of the solenoid actuator and the injector body varies by three distinct ohm values intermittently according to the kinetics of the injection needle of the fuel injector, and the resistive surface coatings are located:
   on at least one contact surface between the injector needle seat and the injection needle,
   on at least one contact surface between a body of the injection nozzle and the injection needle,
   on at least one contact surface between the injection needle and the spacer,
   on at least one contact surface between the body of the injection nozzle and the spacer,
   on at least one contact surface between the injector body and the control valve body, and
   on at least one contact surface between the injector body and the body of the solenoid actuator.

2. The fuel injector as claimed in claim 1, further comprising an additional electrical resistor connected between the body of the solenoid actuator and one of the control wires, said one of the control wires being for measuring the overall electrical resistivity.

3. The fuel injector as claimed in claim 1, further comprising an electric circuit with parallel topology connected between the body of the solenoid actuator and one of the control wires of the solenoid actuator, said one of the control wires being for measuring the overall electrical resistivity, said parallel electric circuit comprising a first electrical resistor in series with a first diode and a second electrical resistor in series with a second diode mounted in a direction opposite to the first diode.

4. The fuel injector as claimed in claim 1, further comprising a wire connected to the body of the solenoid actuator, said wire being for measuring the overall electrical resistivity.

5. The fuel injector as claimed in claim 1, wherein each resistive surface coating arranged on the contact surfaces is an amorphous carbon or a ceramic.

* * * * *